Patented Sept. 24, 1946

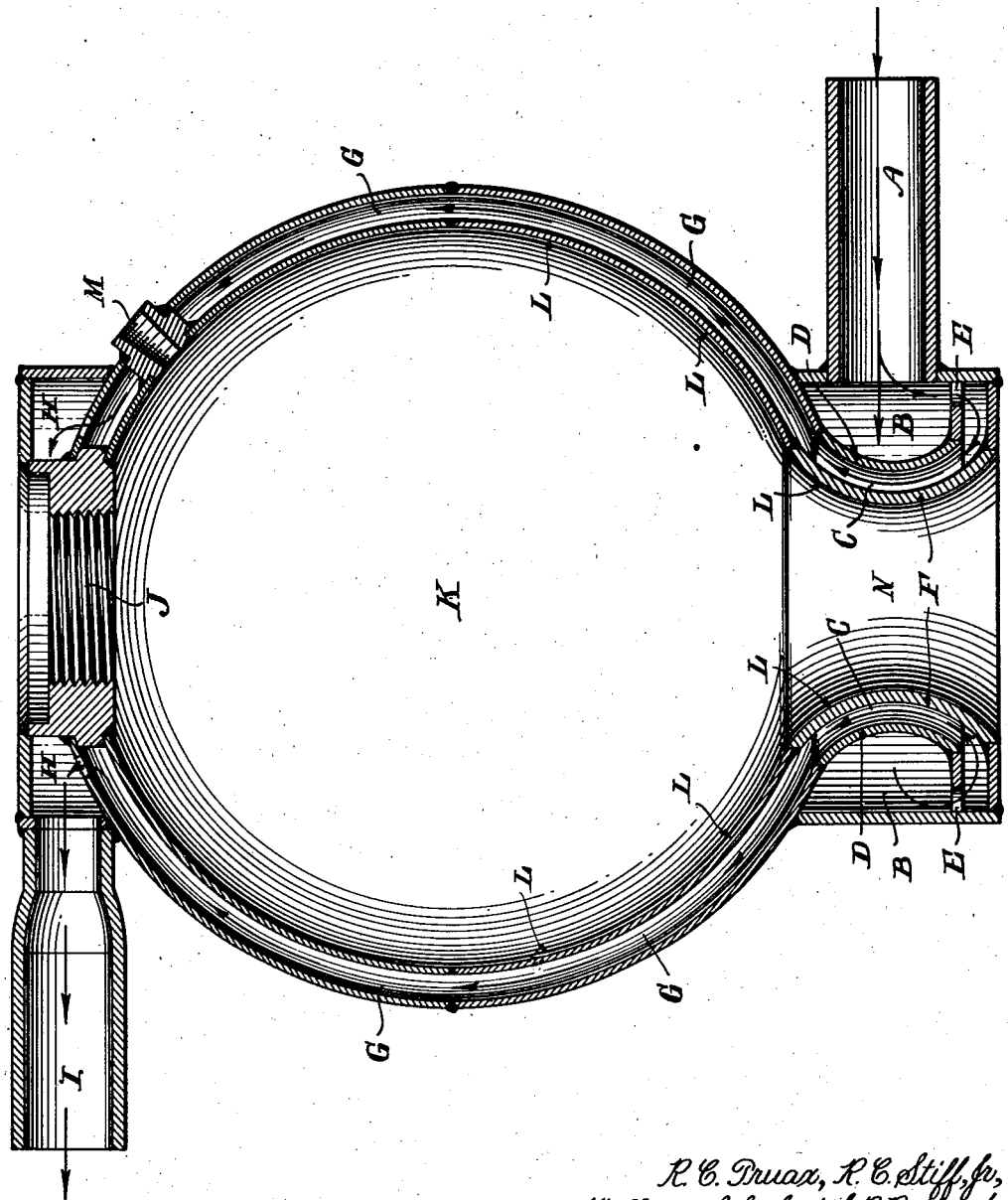

2,408,112

UNITED STATES PATENT OFFICE 2,408,112

ROCKET MOTOR COOLING SYSTEM

Robert C. Truax, Ray C. Stiff, Jr., William Schubert, and James R. Patton, Jr., United States Navy, and Robertson Youngquist, Annapolis, Md.

Application September 18, 1943, Serial No. 502,922

2 Claims. (Cl. 60—35.6)

(Granted under the act of March 3, 1883, as amended April 30, 1928; 370 O. G. 757)

The invention herein described consists of the arrangement and shaping of the different elements of a combustion chamber and cooling-liquid ducts so that most efficient cooling of the hot metal surfaces can be assured. This arrangement is adapted for use particularly in a rocket engine combination of the type disclosed in copending application S. N. 500,584, filed August 30, 1943, entitled Two-stage rocket system.

The object of the present invention is to devise an arrangement of ducts and cooling means for a combustion chamber adaptable for use in rocket type engines such that will enable the engines to operate efficiently and without danger of burning out the chamber walls due to the development of hot spots at points of heat concentration.

The single figure of drawing is an axial cross-section of a cooling arrangement illustrating a preferred form of the invention.

The operation of system is as follows:

The coolant (preferably the oxidizer fluid in the rocket motor since it is usually the propellant available in largest quantity) is admitted to the chamber jacket through pipe A and enters annular jacket B—B. Here it is deflected downward by wall D, which encloses the nozzle jacket, and passes through holes E into the curved annular passage C enclosing the hot rocket motor nozzle wall, F, which is the most critically hot section of the rocket motor due to the high velocity of hot combustion gases flowing out of the nozzle N, downwardly. The holes E are so proportioned in size as to give an even distribution of coolant flow around the periphery of the nozzle. This is necessary because of the asymmetrical location of the inlet pipe. Due to the centrifugal force developed by the coolant's being restricted to a curved flow path by wall F, it makes very intimate contact with the wall F and cools the wall much more efficiently than would a fluid which had no component of force normal to the wall. Then the coolant passes up along the hot chamber walls restricted to a high flow velocity by the narrowness of the cooling jacket space G. At the head end of the motor, the coolant is collected by an annular collecting ring, H, and passes out through pipe I. M is a plug in the chamber wall for insertion of any desirable type of ignition means, if a preliminary combustion chamber is not used in connection with the injector entrance J for supplying the ignition.

Another feature of this system is the spherical or near-spherical shape of the chamber itself. When the propellants (fuel and oxidizer) are injected into the motor by means of an injector screwed into hole J, they burn at K and the products of the combustion are accelerated by gradually converging walls L before being expanded through nozzle N and furnish the thrust of the rocket motor. Due to the high temperature and high velocity (especially at L) of these gases in a motor whose cross-sectional area is small in proportion to its volume, this portion of the wall would be very difficult to cool. The surface should be as smooth and as streamlined as possible. Any sharp change of direction in the wall surface in this critical area is conducive to the development of hot-spots and consequent motor-burnout.

The advantages claimed for this type of cooling system may be summed up as follows:

(1) The relatively cold cooling liquid enters the jacket at the critically hot end first so that it can perform its cooling function most efficiently where it is most needed.

(2) The centrifugal force created by the motion of the coolant along an inner toric surface, as at F, causes the cooling agent to adhere to the wall being cooled, increasing heat transfer and decreasing the possibility of bubbles forming on that surface.

(3) The fluid, filling the jacket, and completely covering the hot metal surface prevents burn-outs in liner wall, even under most extreme temperature conditions encountered.

(4) Due to the uninterrupted surface of the inner wall at L, the rapidly flowing, very hot combustion gases maintain less turbulent flow and so do not transfer their heat to the metal wall as much as would be expected if their flow was more turbulent.

Although the drawing shows only a preferred form of the general arrangement of our cooling means, various modifications of the details and changes in design may be made without departing from the invention as defined in the appended claims.

The invention described herein may be manufactured and used by or for the Government of the United States of America for governmental purposes without the payment of any royalties thereon or therefor.

What is claimed is:

1. In a rocket type internal combustion engine having a combustion chamber and a discharge nozzle, a continuous smooth inner wall formed by a surface of revolution about the axis of the nozzle, the generatrix of said surface being a curve concave opposite its combustion chamber end and convex opposite its nozzle portion, a continuous unobstructed jacket for a cooling medium around said wall, an annular chamber around the nozzle portion of said jacket, having an inlet at one side and outlet passages to the jacket, distributed around the end of the nozzle, so as to provide a uniform delivery of the cooling medium to said end of the jacket, the centrifugal force created by the motion of the cooling medium along the convex curve of the jacket causing the cooling medium to adhere to the wall surrounding the nozzle and increasing the heat transfer and decreasing the possibility of bubbles forming on that surface.

2. In a rocket type internal combustion engine having a combustion chamber and a discharge nozzle, a continuous smooth inner wall formed by a surface of revolution about the axis of the nozzle, the generatrix of said surface having a double arc curvature, being concave at the combustion chamber end and running tangentially into a semi-circular convex portion at the nozzle, a continuous unobstructed jacket for a cooling medium around said wall, an annular chamber around the nozzle portion of said jacket, having an inlet at one side and outlet passages to the jacket, distributed around the end of the nozzle, so as to provide a uniform delivery of the cooling medium to said end of the jacket, the centrifugal force created by the motion of the cooling medium along the convex curve of the jacket causing the cooling medium to adhere to the wall surrounding the nozzle and increasing the heat transfer and decreasing the possibility of bubbles forming on that surface.

R. C. TRUAX.
R. C. STIFF, Jr.
WILLIAM SCHUBERT.
J. R. PATTON, Jr.
ROBERTSON YOUNGQUIST.